United States Patent
Masuda et al.

(10) Patent No.: US 7,058,426 B2
(45) Date of Patent: Jun. 6, 2006

(54) COMMUNICATION TERMINAL APPARATUS

(75) Inventors: Kozo Masuda, Yokohama (JP); Ikuya Arai, Yokohama (JP); Kazuyuki Takizawa, Chigasaki (JP); Junichi Nishimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 10/290,445

(22) Filed: Nov. 8, 2002

(65) Prior Publication Data
US 2003/0092467 A1    May 15, 2003

(30) Foreign Application Priority Data
Nov. 9, 2001   (JP) .............................. 2001-344011

(51) Int. Cl.
H04B 1/38    (2006.01)
H04B 1/00    (2006.01)
H04Q 1/22    (2006.01)

(52) U.S. Cl. ...................... 455/566; 455/572; 455/573; 340/10.1; 340/7.38; 399/88

(58) Field of Classification Search .............. 455/572, 455/573, 90, 574, 575.1, 575.3, 566; 340/7.38, 340/10.1; 379/93.17; 348/14.02; 349/143; 307/18; 399/88
See application file for complete search history.

(56) References Cited

U.S. PATENT DOCUMENTS

| | | | | |
|---|---|---|---|---|
| 5,444,867 A * | 8/1995 | Marui et al. | ................. | 455/573 |
| 5,511,240 A * | 4/1996 | Nishiyama | ................ | 455/127.1 |
| 5,649,314 A * | 7/1997 | Yamada et al. | ............ | 340/7.38 |
| 5,832,366 A * | 11/1998 | Umetsu | ...................... | 340/7.38 |
| 5,862,437 A * | 1/1999 | Kutsuwada et al. | .......... | 399/88 |
| 6,073,034 A * | 6/2000 | Jacobsen et al. | ............ | 455/566 |
| 6,140,714 A * | 10/2000 | Fujii | ........................... | 307/18 |
| 6,141,569 A * | 10/2000 | Weisshappel et al. | ....... | 455/572 |
| 6,342,738 B1* | 1/2002 | Lutnaes | ...................... | 307/125 |
| 6,374,127 B1* | 4/2002 | Park | .......................... | 455/572 |
| 6,466,292 B1* | 10/2002 | Kim | .......................... | 349/143 |
| 6,535,239 B1* | 3/2003 | Kim | ........................ | 348/14.02 |

(Continued)

FOREIGN PATENT DOCUMENTS

JP    11-184576    7/1999

(Continued)

*Primary Examiner*—William Trost
*Assistant Examiner*—Kiet Doan
(74) *Attorney, Agent, or Firm*—McDermott Will & Emery LLP

(57) ABSTRACT

A communication terminal apparatus which improves the a quality of an additional function such as image processing, music reproduction etc. over repressing power consumption is provided. The communication terminal apparatus has a transmission and reception unit adapted to transmit or receive a signal including a voice signal or an image signal, a decode processing unit adapted to decode a received signal, a first control circuit for controlling the transmission and reception unit and the decode processing unit, a second control circuit for processing an image signal which is outputted from the decode processing unit, a first power supply unit adapted to supply electric power to the first control circuit, and a second power supply unit adapted to supply electric power to the second control circuit, and in case that the communication terminal apparatus is not operated for a given length of time, the second power supply unit reduces electric power to the second control circuit.

12 Claims, 5 Drawing Sheets

U.S. PATENT DOCUMENTS

| | | | |
|---|---|---|---|
| 6,542,721 B1 * | 4/2003 | Boesen | 455/553.1 |
| 6,587,700 B1 * | 7/2003 | Meins et al. | 455/575.8 |
| 6,600,662 B1 * | 7/2003 | Emmert et al. | 361/814 |
| 6,771,980 B1 * | 8/2004 | Moon | 455/553.1 |
| 6,792,293 B1 * | 9/2004 | Awan et al. | 455/566 |
| 6,946,950 B1 * | 9/2005 | Ueno et al. | 340/10.1 |
| 2001/0002926 A1 * | 6/2001 | Moon | 379/93.17 |
| 2001/0003707 A1 * | 6/2001 | Takashiro | 455/566 |
| 2001/0051510 A1 * | 12/2001 | Nakamura | 455/90 |
| 2002/0077159 A1 * | 6/2002 | Jiang | 455/572 |

FOREIGN PATENT DOCUMENTS

| | | |
|---|---|---|
| JP | 11-219239 | 8/1999 |
| JP | 2000-293182 | 10/2000 |
| JP | 2000-308269 | 11/2000 |
| JP | 2001-086205 | 3/2001 |
| JP | 2001-168999 | 6/2001 |
| JP | 2001-169033 | 6/2001 |
| JP | 2002-353870 | 12/2002 |
| JP | 2003-029957 | 1/2003 |

* cited by examiner (a) OPENED STATE (b) CLOSED STATE (a) GRAPHICS DISPLAY　　　　　　　(b) TEXT DISPLAY

COMMUNICATION TERMINAL APPARATUS

BACKGROUND OF THE INVENTION

This invention relates to communication terminal apparatuses which communicate by voice and data.

In these years, portable telephones which have game functions and music reproduction functions other than telephone call functions have been provided. For example, JP-A-2000-308269 gazette discloses a portable telephone which has the telephone call function and the music reproduction function. Also, because of popularization of the Internet and web-sites for portable telephones, looking at still images or moving images has been carried out by the portable telephones.

Since a main purpose of such portable telephone is a voice communication, its ability is not enough to carry out image processing such as expansion of compressed image data etc. As a result, there is a problem that good quality images can not be reproduced on a display screen.

Further, in case that quality of an additional function such as image processing ability etc. is tried to be improved, processing load other than the telephone call function is increased and it affects the be-all telephone call function. In the above gazette, it is described that when remaining amount of a battery is down to less than a predetermined value, the additional functions other than the telephone call function are stopped and thereby, the telephone call function as a basic function is maintained. However, there is a problem that when electric power itself to be consumed is not repressed, in case that the additional functions are being made to be of high quality, a case that their functions can not be utilized is getting increased.

SUMMARY OF THE INVENTION

Then, an object of the invention is to provide a communication terminal apparatus in which quality of the additional function such as image processing, music reproduction etc. is improved over repressing power consumption.

In order to solve the problem points, a communication terminal apparatus relating to the invention is of a structure having a transmission and reception unit adapted to transmit or receive a signal including a voice signal or an image signal, a decode processing unit adapted to decode a signal which is received by the transmission and reception unit, a first control circuit for controlling the transmission and reception unit and the decode processing unit, a second control circuit for processing an image signal which is outputted from the decode processing unit, a first power supply unit adapted to supply electric power to the first control circuit, and a second power supply unit adapted to supply electric power to the second control circuit. Then, it is characterized that, in case that the communication terminal apparatus is not operated for more than a given length of time, the second power supply unit reduces electric power to the second control circuit. Or, the communication terminal apparatus is a folding type apparatus and is characterized that, in case that the communication terminal apparatus is closed, the second power supply unit reduces electric power to the second control circuit.

DETAILED DESCRIPTION OF THE INVENTION

An embodiment of the invention will be described with reference to the drawings.

Figure 1:
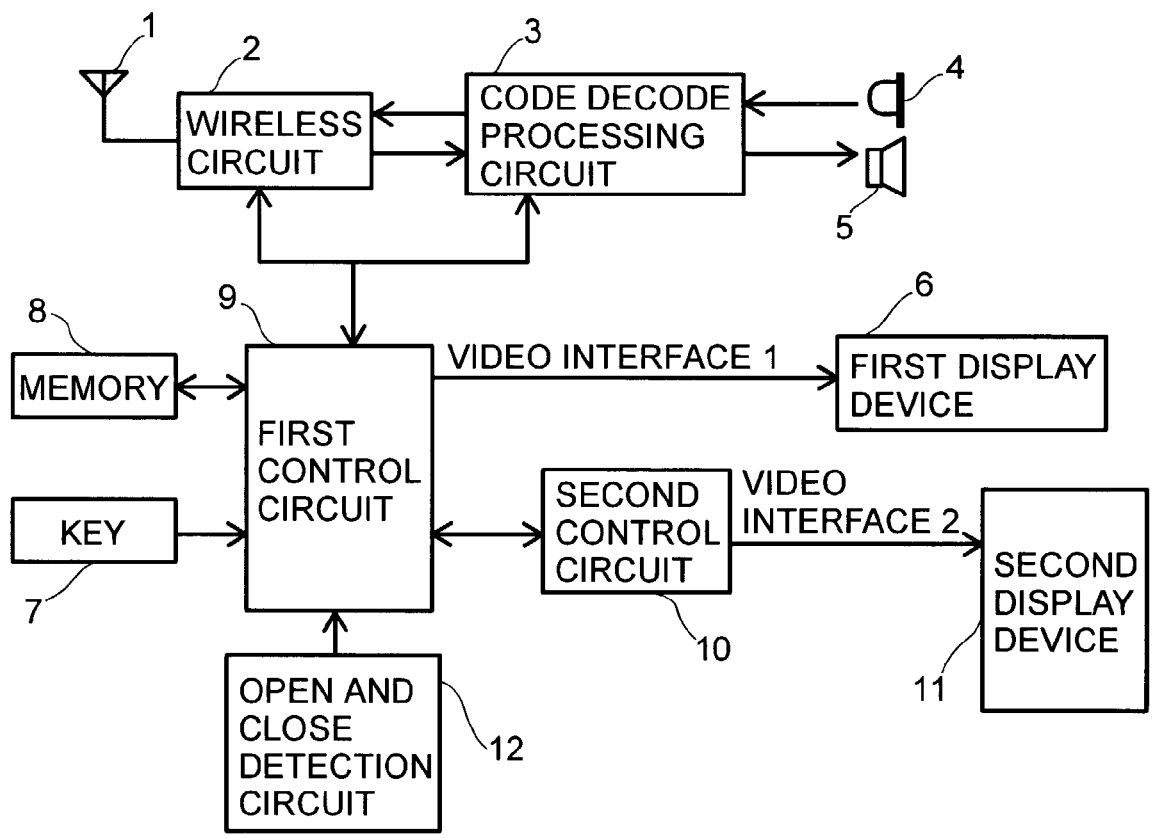
FIG. 1 is a view showing a structure of a communication terminal apparatus according to a first embodiment of the invention.

A first embodiment is one in which the invention is applied to a communication terminal apparatus such as a portable telephone etc. FIG. 1 is a block diagram showing a structure of a communication terminal apparatus according to the first embodiment. In FIG. 1, 4 designates a microphone, and 7 designates a key input device.

Hereinafter, operations of respective parts will be described. An antenna 1 receives electromagnetic waves which have been transferred through the air, and coverts them into high frequency electric signals and inputs to a wireless circuit 2. Also, it converts the high frequency electric signals which are outputted from the wireless circuit 2 into electromagnetic waves and emits them in the air. The wireless circuit 2, based upon an instruction of a first control circuit 9, decodes the high frequency electric signals which were received by the antenna 1 and inputs them to a code decode processing circuit 3. Also, the wireless circuit 2 applies modulation processing to output signals of the code decode processing circuit 3, and converts them into high frequency electric signals and outputs to the antenna 1.

The code decode processing circuit 3, after it applied decode processing to output signals of the wireless circuit 2, outputs voice data to a speaker 5, and outputs compressed music data and compressed image data to a second control circuit 10 via a first control circuit 9. The first control circuit and the second control circuit 10 are, for example, CPUs.

Figure 2:
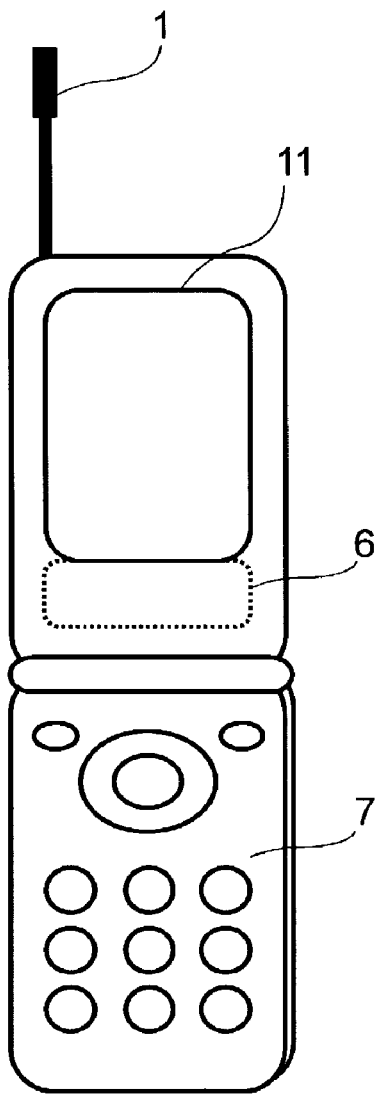
FIG. 2 is a view showing one example of an external appearance of the communication terminal apparatus according to the invention.
Figure 2:
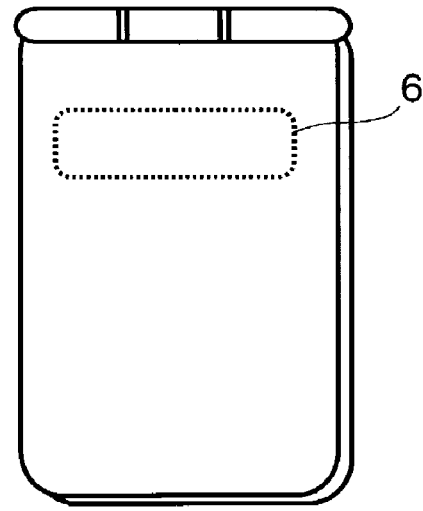
Figure 4:
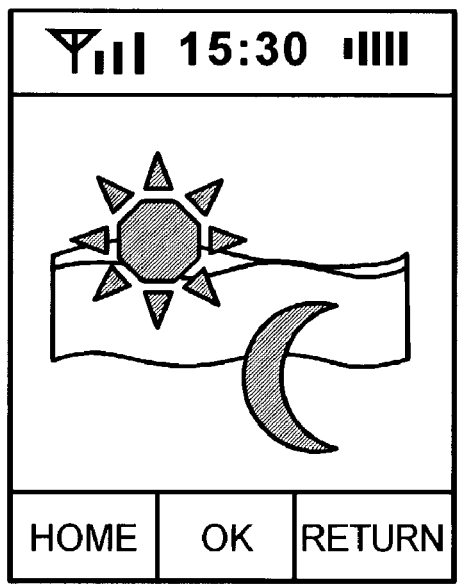
FIG. 4 shows a display example of a second display device of the communication terminal apparatus according to the embodiment of the invention.
Figure 4:
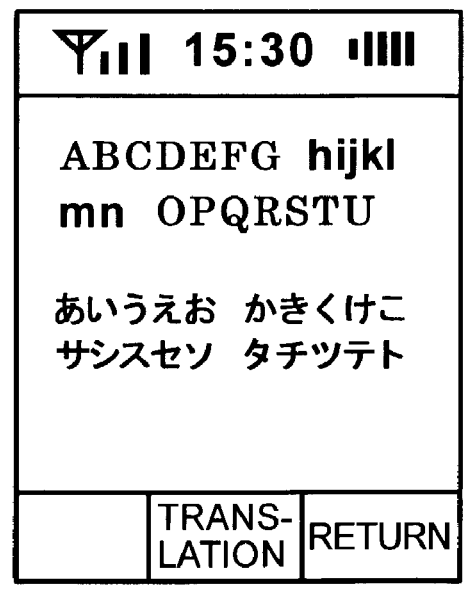

The first control circuit 9 detects, by an open and close detection circuit 12, whether the communication terminal apparatus is in a state that a terminal is opened as shown in FIG. 2A, or in a state that the terminal is closed as shown in FIG. 2B. In case that the terminal is opened as shown in FIG. 2A, it detects a key which is inputted by a key input device 7, and outputs a code showing a character or a graphic which corresponds to the inputted key, to the second control circuit 10. A code which shows the character or graphic which was inputted from the first control circuit 9 is defined as a character or a graphic, and outputted to a second display device 11. For example, as shown in FIG. 4, it is displayed on the second display device 11.

Figure 3:
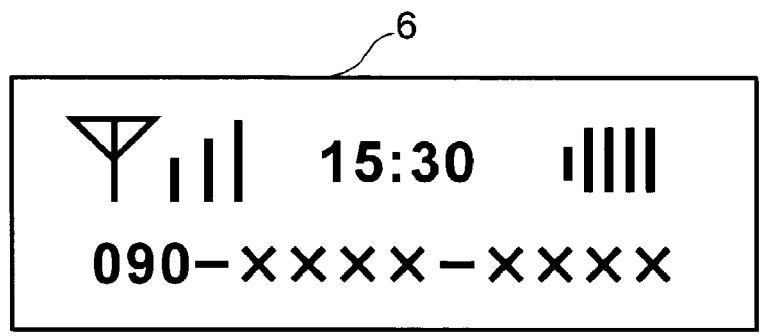
FIG. 3 shows a display example of a first display device of the communication terminal apparatus according to the embodiment of the invention.

On the other hand, in case that the terminal is closed as shown in FIG. 2B, in accordance with a code from the code decode processing circuit 3, an image signal for displaying text or graphic information in accordance with the code is outputted from a memory 8 to the first display device 6. For example, as shown in FIG. 3, it is displayed on the first display device 6.

The second control circuit 10 processes compressed image data to be expanded at high speed for generating images. Or, it processes compressed music data to be expanded for reproducing music. By carrying out the expansion processing of compressed image data etc. which has large processing load by the second control circuit 10, even in case that a user is looking at moving images, the first control circuit 9 can dedicate itself to voice communication processing. Therefor, harmful results such as disconnection due to time-out etc. are drastically reduced, and it is possible to secure telephone calls as a basic function of the communication terminal apparatus. As such, according to the embodiment, by providing the second control circuit 10 for carrying out image processing and music reproduction other than the first control circuit, it is possible to improve qualities of the image processing function and the music reproduction function, over maintaining the telephone call function.

A video interface 1 and a video interface 2 may be ones using digital signals which are synchronized with horizontal and vertical synchronization signals, and may be parallel buses like CPU buses. Also, even in case that they are a serial bus of two wire system or three wire system, it does not depart from the invention.

A second embodiment of the invention will be described.

Figure 5:
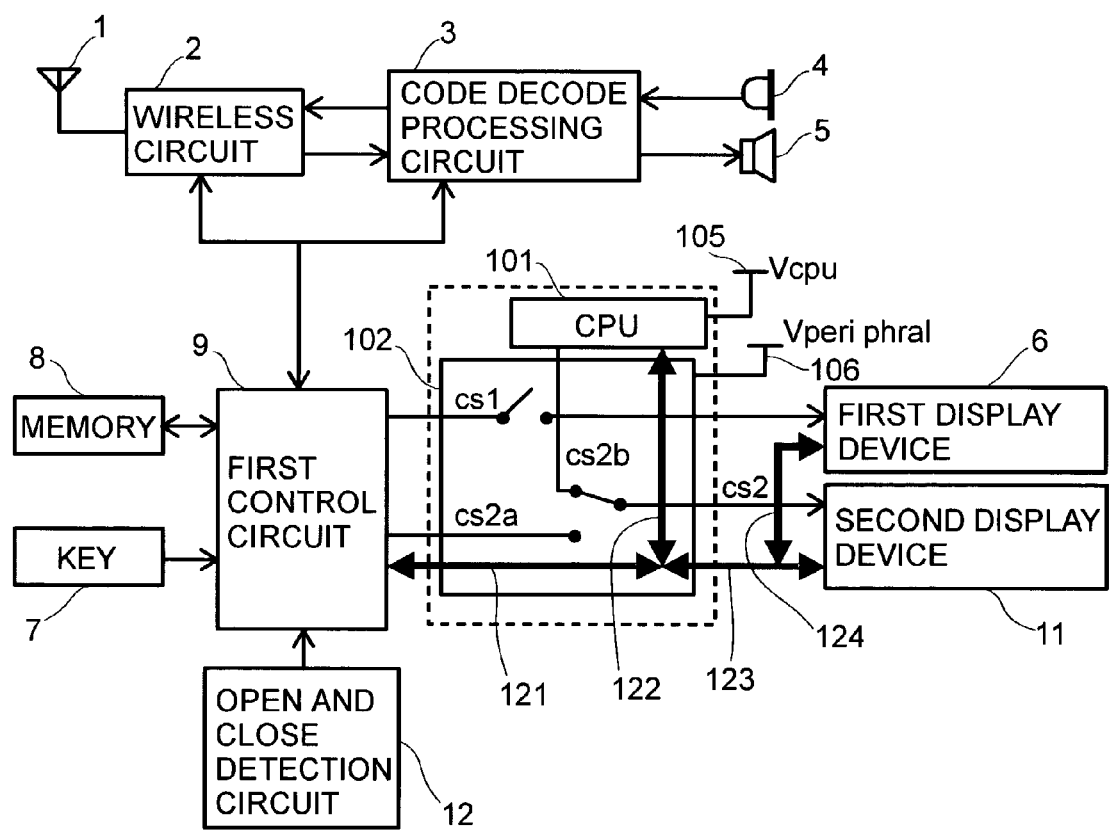
FIG. 5 is a view showing a structure of a communication terminal apparatus according to a second embodiment of the invention.

FIG. 5 is a block diagram showing a structure of the second embodiment of the invention. The same symbols are given to the same portions as in FIG. 1, and overlapping descriptions will be omitted.

In FIG. 5, 101 denotes a CPU as the second control circuit, 102 denotes a peripheral circuit of the second control circuit, and 104 denotes a change-over switch for selecting a chip select signal CS2*b* from the CPU 101 and a chip select signal CS2*a* from the first control circuit 9 and outputting it. The chip select signal means a control signal for instructing a timing for fetching a signal which was outputted to buses.

105 denotes a power supply for the CPU 101, and 106 denotes a power supply for the peripheral circuit 102. The reason that power supplies for the CPU 101 and the peripheral circuit 102 are separated is that, in case that a set is closed as shown in FIG. 2B, or in case that the set is opened as shown in FIG. 2A and left as it is for a certain given length of time, only the power supply 105 for the CPU 101 can be turned OFF so that it is possible to save electricity. By use of such structure, the first control circuit 9 can supply image data through the peripheral circuit 102 to the first display device 6 and the second display device 11.

The change-over switch 102, in case that the set is opened to be used as shown in FIG. 2A, selects the chip select signal CS2*b* of the CPU 101 and supplies image data to the second display device 11. Then, the second display device 11 displays the image by control of the CPU 101.

In case that, despite of completion of a telephone call, it is remained opened and left as it is for a given length of time, the power supply 105 for the CPU 101 is turned OFF. The change-over switch 104 selects the chip select signal CS2*a* of the first control circuit 9, and supplies image data to the second display device. The second display circuit 11 displays the image data by control of the first control circuit 9.

As such, by turning the power supply 105 for the CPU 101 OFF and carrying out the display on the second display device by the first control circuit, it is possible to repress power consumption. In addition, it is not limited to a case that supply of electric power to the CPU 101 is made to be completely 0 and it may be applied to a case that very small electric power is controlled to be supplied. In this case, although some amount of electric power is consumed as compared with the case that supply of electric power is completely stopped, it is possible to reduce time required for rebooting the CPU 101 and a load to the CPU 101

Figure 6:
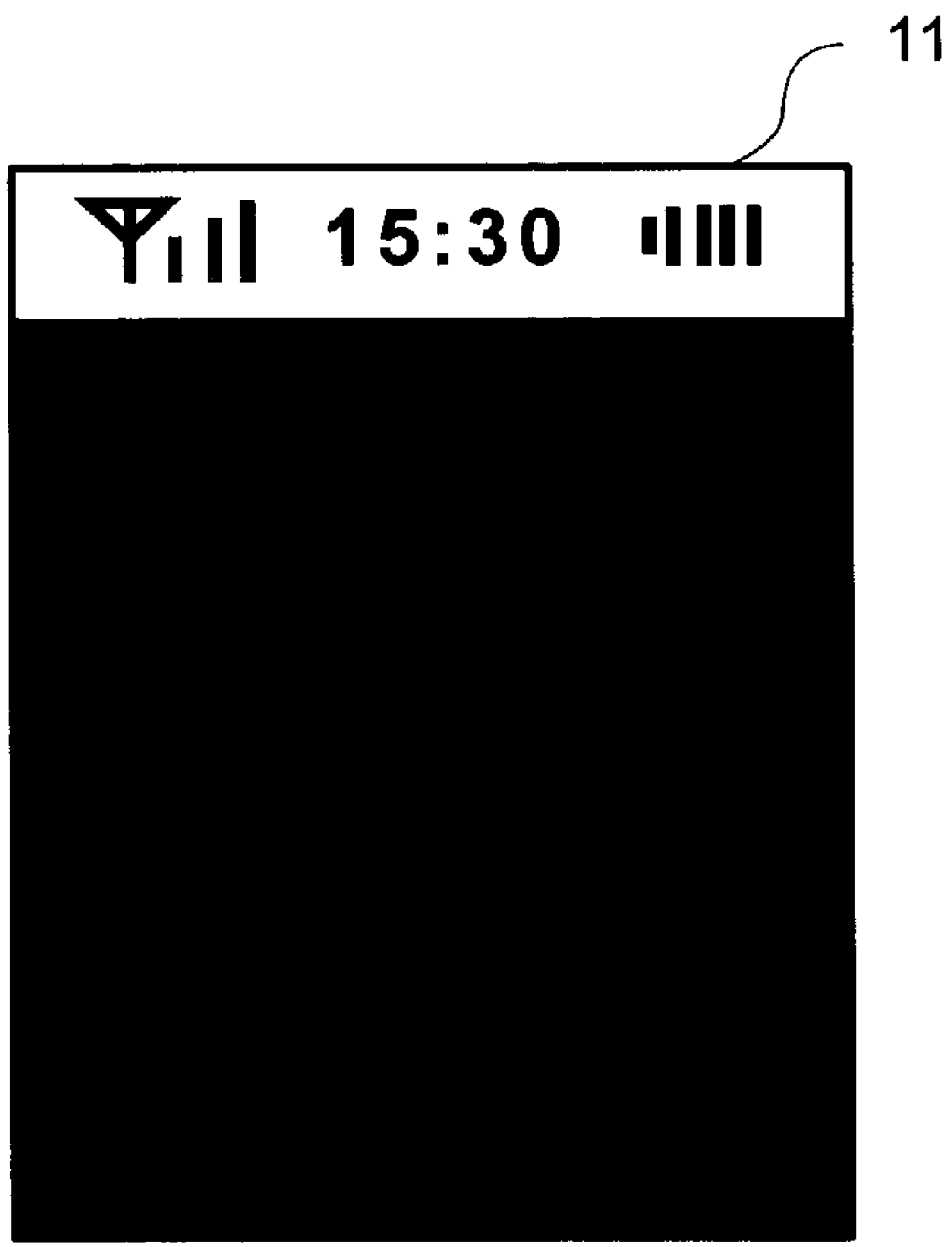
FIG. 6 shows a display example of a second display device of the communication terminal apparatus according to the embodiment of the invention.

Also, the second display device, as shown in FIG. 6, may carry out display in a partial mode in which display is carried out on a part of a screen, and may carry out display by reducing the number of colors to be displayed. By carrying out such display, it is possible to further reduce power consumption.

Also, the case that display is carried out on the second display device 11 was described as one example but this is not a limitation, and the display may be carried out on a display device with lower power consumption when remaining amount of the battery is less than a certain given quantity. For example, the display is carried out on the first display device 6 with a smaller display screen.

In addition, in case that image processing etc. are not carried out and the communication terminal apparatus is closed as well as a case that there is no key input and it is left for a given length of time, electric power to the CPU 101 may be turned OFF and the display device may be controlled by the first control circuit.

Also, the case that 2 CPUs (control circuits) are provided was described, but even in case of a communication terminal apparatus having 3 and more CPUs, it is possible to reduce power consumption by controlling so that electric power to a CPU for an application such as image processing, music reproduction etc. is turned OFF or reduced down to very small amount of electric power, in case that the image processing and music recording and reproduction processing are not carried out.

Then, proper use of bus width in the embodiment will be described.

In FIG. 5, 121 denotes a bus for connecting the first control circuit 9 and the peripheral circuit 102, 122 denotes a bus for connecting the CPU 101 and the peripheral circuit 102, 123 denotes a bus for connecting the peripheral circuit 102 and the second display device 11, and 124 denotes a bus for connecting the peripheral circuit 102 and the first display device 6. Here, a case that the bus 121 uses 8 bit bus width, the bus 122 uses 16 bit bus width, the bus 123 uses 16 bit bus width and the bus 124 uses 8 bit bus width will be described by way of example.

When bus width is enlarged, it is possible to send much more information at one time and therefore, transmission efficiency is improved, but at the same time, many signal lines are required, and therefore, there is a disadvantage that a package is enlarged due to increase of the number of terminal posts, and size of a substrate is enlarged due to increase of the number of signal lines. Then, in the embodiment, 8 bit bus width and 16 bit bus width are properly used according to need.

In FIG. 5, since the bus 121 for connecting the first control circuit 9 and the peripheral circuit 102 mainly transmits commands and compressed data, it does not require a large amount of data transfer capacity and therefore, it uses 8 bit bus width. Since the bus 122 for connecting the CPU 101 and the peripheral circuit 102 is an internal bus of the second control circuit 10, there is no influence to the set even when its width is large. Also, since it is used for calculation processing and expanded large volumetric data transfer, it requires data transfer capacity and therefore, uses 16 bit width. Since the bus 123 for connecting the peripheral circuit 102 and the second display device 11 transfers image data which includes mainly moving images, it uses 16 bit width. Since the bus 124 for connecting the peripheral circuit 102 and the first display device 6 is used for displaying characters and simple graphics mainly on the first display device, it uses 8 bit width.

As such, by setting bus width of respective buses, in accordance with required data transfer capacity and location in the set, it is possible to improve transmission efficiency as well as repressing enlargement of the package.

In addition, in the embodiment, the case that 8 bit or 16 bit width bus is used was described as one example, but there is no limitation to this, and 32 bit and more bus width may be used. Also, in case of lower bit, 4 bit bus may be used and a serial bus of 2 wire system or 3 wire system may be used.

In the first and second embodiment as described above, the case that the invention is applied to a so-called folding type communication terminal apparatus as shown in FIGS. 2A and 2B was described, but it is not limited to this, and it may be applied to a so-called "straight type" communication terminal apparatus.

According to the invention, it is possible to improve quality of an additional function such as image processing, music reproduction etc. over repressing power consumption. Many different embodiments of the present invention may be constructed without departing from the spirit and scope of the invention. It should be understood that the present invention is not limited to the specific embodiment described in this specification. To the contrary, the present invention is intended to cover various modifications and equivalent arrangements included within the spirit and scope of the claims.

We claim:

1. An open/close communication terminal apparatus including a first case with a display unit and a second case with an input unit connected with the first case, the apparatus comprising:
    a transmission and reception unit which transmits or receives a signal including a voice signal or an image signal;
    a first control unit which controls the transmission and reception unit and processes voice communication processes;
    a second control unit which controls the display unit and processes expansion processes of compressed image data;
    a first power supply unit adapted to supply electric power to the first control circuit;
    a second power supply unit adapted to supply electric power to the second control circuit; and
    an open/close detection unit which detects an open/close status of the communication terminal apparatus;
    wherein the control of the display unit is switched from the second control unit to the first control unit responsive to the communication terminal apparatus being opened for a given period of time.

2. A communication terminal apparatus according to claim 1, wherein the first control unit and the second control unit are different chips.

3. A communication terminal apparatus according to claim 1, wherein the first control unit controls the display unit through an internal bus in the second control unit.

4. A communication terminal apparatus according to claim 1, wherein:
    the second control unit includes a control circuit and a peripheral circuit, and
    the first control unit controls the display unit through the peripheral circuit of the second control unit.

5. A communication terminal apparatus according to claim 4, wherein power supplies for the control circuit and the peripheral circuit are controlled separately.

6. A communication terminal apparatus according to claim 1, wherein power supplied to the second control circuit is reduced responsive to the communication terminal apparatus being in a closed status.

7. A communication terminal apparatus according to claim 1, wherein the first control unit supplies image data to the display unit responsive to the communication terminal apparatus being opened for a given period of time.

8. A communication terminal apparatus according to claim 1, wherein the communication terminal apparatus is a folding type apparatus.

9. An open/close type communication terminal apparatus including a first case with a display unit and a second case with an input unit connected with the first case, the communication terminal apparatus comprising:
    a transmission and reception unit which transmits or receives a signal including a voice signal or an image signal;
    a first control unit which controls the transmission and reception unit, and processes voice communication processes;
    a second control unit which controls the display unit and processes expansion processes of compressed image data;
    a first power supply unit adapted to supply electric power to the first control circuit;
    a second power supply unit adapted to supply electric power to the second control circuit; and
    an open/close detection unit which detects an open/close status of the communication terminal apparatus;
    wherein the control of the display unit is switched from the second control unit to the first control unit responsive to the communication terminal apparatus being in a closed status.

10. An open/close type communication terminal apparatus including a first case with a display unit and a second case with an input unit connected with the first case, the communication terminal apparatus comprising:
    a transmission and reception unit which transmits or receives a signal including a voice signal or an image signal;
    a first control unit which controls the transmission and reception unit and processes voice communication processes;
    a second control unit which controls the display unit and processes expansion processes of compressed image data;
    a first power supply unit adapted to supply electric power to the first control circuit;
    a second power supply unit adapted to supply electric power to the second control circuit; and
    an open/close detection unit which detects an open/close status of the communication terminal apparatus;
    wherein the display unit is controlled by the first control unit responsive to the communication terminal apparatus being in a closed status.

11. An open/close type communication terminal apparatus with a first case and a second case which is capable of transmitting and receiving a voice signal or an image signal, the communication terminal apparatus comprising:
    a transmission and reception unit which transmits or receives a signal including a voice signal or an image signal;
    a first display unit;

a second display unit;
a first control unit which controls the transmission and reception unit and processes voice communication processes; and
a second control unit which controls the first display unit and the second display unit, and processes expansion processes of compressed image data;
a first power supply unit adapted to supply electric power to the first control circuit; and
a second power supply unit adapted to supply electric power to the second control circuit;
wherein:
responsive to the communication terminal apparatus being in an opened status, a display function of the communication terminal apparatus is performed by the second display unit controlled by the second control unit, and
responsive to the communication terminal apparatus being in a closed status, control of the display function is switched form the second control unit to the first control unit, and the display function is performed by the first display unit controlled by the first control unit.

12. A communication terminal apparatus according to claim 11, wherein the first display unit displays mainly characters and the second display unit displays mainly an image.

* * * * *